United States Patent
Tseng et al.

(10) Patent No.: US 7,646,168 B2
(45) Date of Patent: Jan. 12, 2010

(54) ELECTRICAL DEVICE WITH ADJUSTABLE VOLTAGE

(75) Inventors: Hsiang-Pin Tseng, Taipei (TW); Min-Wei Lee, Taipei (TW); Tien-Peng Yu, Taipei (TW)

(73) Assignee: Asustek Computer Inc., Peitou, Taipei (TW)

( * ) Notice: Subject to any disclaimer, the term of this patent is extended or adjusted under 35 U.S.C. 154(b) by 277 days.

(21) Appl. No.: 11/429,541

(22) Filed: May 5, 2006

(65) Prior Publication Data

US 2007/0019347 A1    Jan. 25, 2007

(30) Foreign Application Priority Data

Jul. 19, 2005   (TW) ............................... 94124405 A

(51) Int. Cl.
*H02J 7/00* (2006.01)
(52) U.S. Cl. .................. 320/114; 320/106; 320/138
(58) Field of Classification Search ......... 320/107–115, 320/137, 138
See application file for complete search history.

(56) References Cited

U.S. PATENT DOCUMENTS

| 5,187,425 | A  | * | 2/1993  | Tanikawa ............... 320/138 |
| 5,847,543 | A  |   | 12/1998 | Carroll |
| 5,986,437 | A  | * | 11/1999 | Lee ..................... 320/162 |
| 5,998,972 | A  | * | 12/1999 | Gong .................... 320/134 |
| 6,104,163 | A  | * | 8/2000  | Komatsu et al. ........ 320/116 |
| 6,222,347 | B1 | * | 4/2001  | Gong .................... 320/137 |
| 6,864,669 | B1 | * | 3/2005  | Bucur ................... 323/268 |
| 6,977,448 | B2 | * | 12/2005 | Kanouda et al. .......... 307/66 |
| 7,215,096 | B2 | * | 5/2007  | Miura et al. ........... 320/134 |

FOREIGN PATENT DOCUMENTS

JP             405003635 A   *  1/1993

* cited by examiner

*Primary Examiner*—Edward Tso
*Assistant Examiner*—Samuel Berhanu
(74) *Attorney, Agent, or Firm*—Thomas, Kayden, Horstemeyer & Risley

(57) ABSTRACT

An electrical device is provided. The electrical device of this invention includes a voltage control circuit that couples with an AC-DC adapter and a charger. The voltage control circuit uses the charger to determine the condition of the battery and controls the AC-DC adapter to generate different output voltages by the conditions of the system loading and the battery. The electrical device can be used for portable equipment.

8 Claims, 3 Drawing Sheets

ELECTRICAL DEVICE WITH ADJUSTABLE VOLTAGE

RELATED APPLICATIONS

The present application is based on, and claims priority from, Taiwan Application Serial Number 94124405, filed Jul. 19, 2005, the disclosure of which is hereby incorporated by reference herein in its entirety.

BACKGROUND

1. Field of Invention

The present invention relates to an electric device. More particularly, the present invention relates to an electric device that can adjust the output voltage according to the loading conditions.

2. Description of Related Art

Portable devices, such as the digital camera, notebook computer, personal digital assistant (PDA), and cellular phone, have been developed so abundantly that they have become the dominant trend of electric products. The battery, power adapter and DC-DC converter are the essential parts of these portable devices.

The Buck DC-DC converter is 80% more efficient than the traditional linear converter. However, the DC-DC converter has lower efficiency under higher input voltage and has higher efficiency under lower input voltage.

FIG. 1 is a functional block diagram of a traditional power supply system. The adapter 105 generates a fixed voltage for charging the circuit (charger) 130 to charge the battery 110, and this fixed voltage also supplies the power for the system 115 via a first switch (SW1) 120 and couples of DC-DC converters. When the system 115 is not coupled with the adapter 105, the second switch (SW2) 125 is conductive and the battery 110 supplies the power for the system 115.

Because the supply voltage has to be higher than the whole voltage of the battery set, the adapter 105 needs to output higher voltage when charging. However, if the adapter 105 always outputs higher and fixed voltage whether charging or not, it causes the adapter to be less efficient. Moreover, the charging time is just a fraction of the whole operation time for a notebook computer; thus the efficiency of adapter 105 is made even less efficient by outputting high voltage continuously.

SUMMARY

It is therefore an objective of the present invention to provide an electric device for adjusting the voltage.

It is therefore another objective of the present invention to provide an electric device for portable devices, such as notebook computers.

It is therefore still another objective of the present invention to provide an electric device for outputting different voltages according to whether the system needs charging or not.

It is still another objective of the present invention to provide an electric device of better efficiency without higher and fixed output voltage.

In accordance with the foregoing and other objectives above, the present invention offers an electric device that includes a charging circuit, a voltage control circuit and an adapter. The charging circuit generates a signal according to the situation of DC-DC converters and the batteries. And the voltage control circuit transforms the signal from the charging circuit for inducing the adapter to adjust the output voltage. Therefore, the efficiency loss will thereby be reduced.

BRIEF DESCRIPTION OF THE DRAWINGS

The invention can be more fully understood by reading the following detailed description of the preferred embodiments with reference made to the accompanying drawings as follows.

DESCRIPTION OF THE PREFERRED EMBODIMENTS

Figure 1:
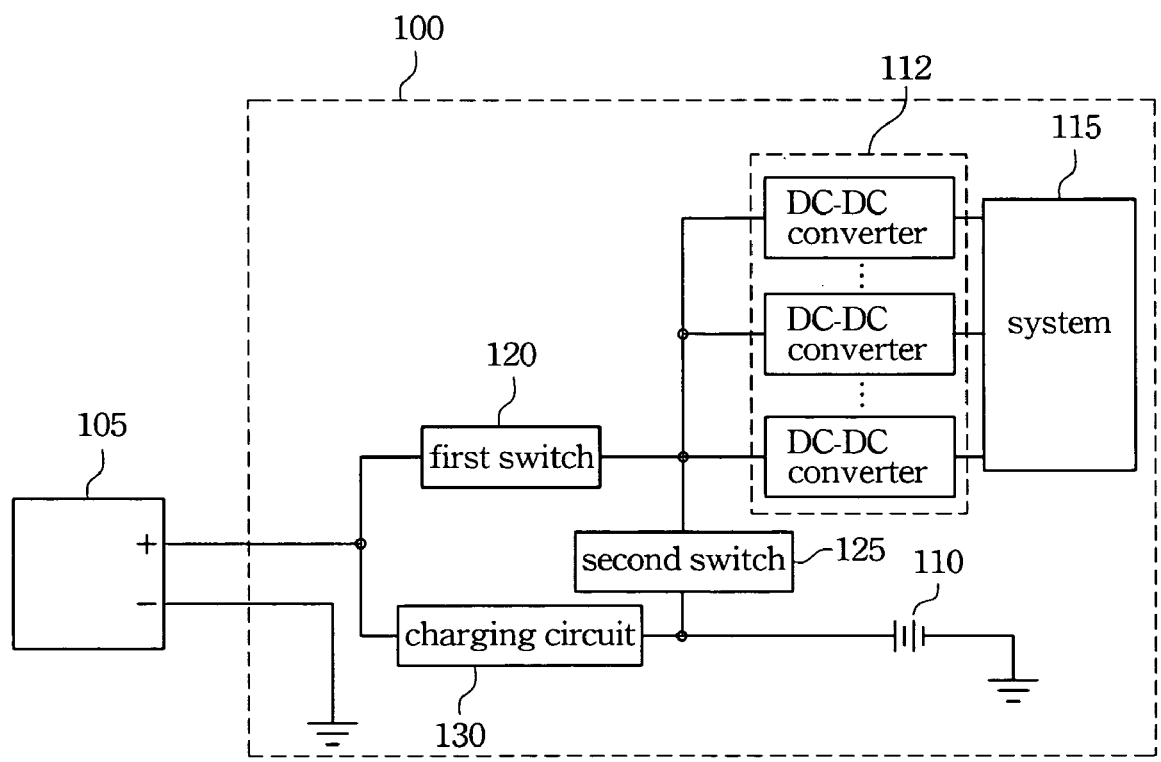
FIG. 1 is a functional block diagram of a traditional power supply system.

Reference will now be made in detail to the present preferred embodiments of the invention, examples of which are illustrated in the accompanying drawings. Wherever possible, the same reference numbers are used in the drawings and the description to refer to the same or like parts.

Figure 2A:
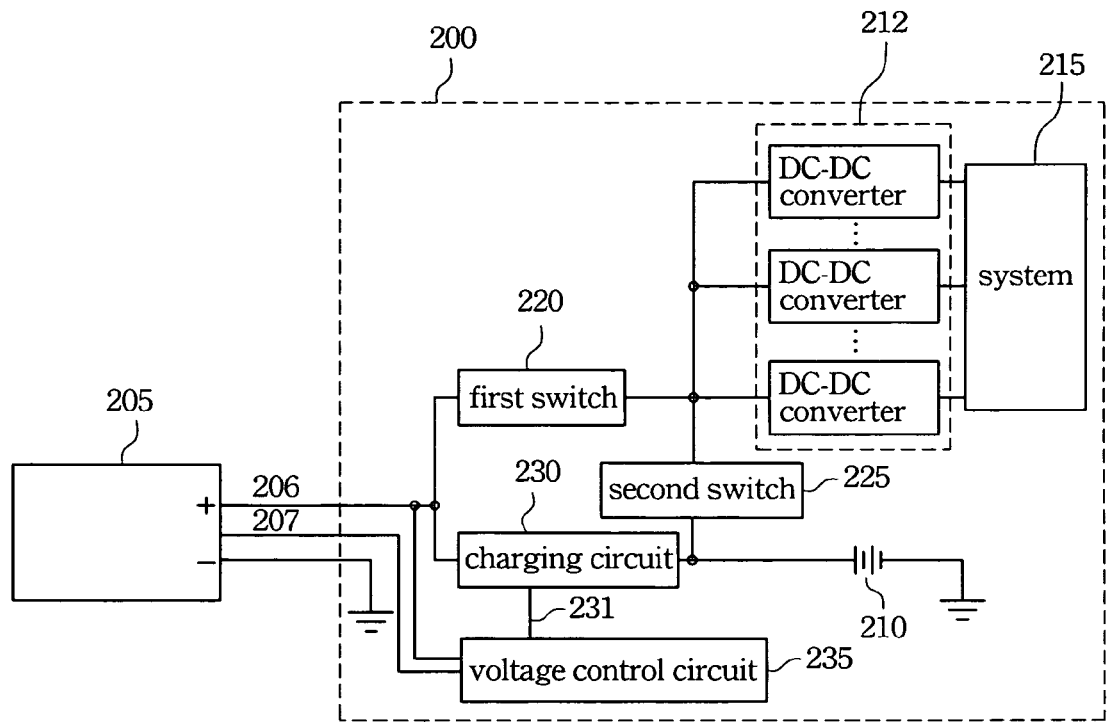
FIG. 2A is a functional block diagram of the control circuit built on a motherboard according to one preferred embodiment of this invention.

The present invention is an electric device that includes a charging circuit, a voltage control circuit and an adapter. FIG. 2A is a functional block diagram of the control circuit built on a motherboard according to one preferred embodiment of this invention. This embodiment comprises a voltage control circuit 235, an adapter 205 of this invention and a charging circuit 230, wherein the voltage control circuit 235 is built on the motherboard 200. The adapter 205 of this invention couples with the charging circuit 230, and the charging circuit 230 couples with a battery 210. Otherwise, the adapter 205 of this invention couples with the system 215 via the first switch 220 and the DC-DC converters 212. The voltage control circuit 235 couples with the charging circuit 230 via the first signal line 231, and the voltage control circuit 235 couples with the adapter 205 of this invention via voltage output line 206 and second signal line 207.

One function of the charging circuit 230 is to offer required electric power to the battery 210 during charging process. Another function of the charging circuit 230 is to generate the first signal through the first signal line 231 to the voltage control circuit 235 according to whether the battery 210 is charged or not. The function of the voltage control circuit 235 is to receive the first signal from the first signal line 231 and the charging circuit 230. And the voltage control circuit 235 generates the second signal to the second signal line 207 and the adapter 205 of this invention. The function of the adapter 205 of this invention is to transform the AC input voltage to be DC input voltage and adjust the DC output voltage to be a first voltage (original voltage) or a second voltage according to the second signal of second signal line 207 from the voltage control circuit 235.

When the charging circuit 230 detects that the battery 210 does not need to be charged, the first switch 220 is conductive. Therefore, the adapter 205 of this invention supplies the power for the DC-DC converters 212 via the first switch 220. When the charging circuit 230 detects that the battery 210 needs to be charged, the adapter 205 of this invention supplies the power for the battery 210 via the charging circuit 230, and the adapter 205 of this invention supplies the power for the DC-DC converters 212 via the first switch 220. Furthermore, when the DC-DC converters 212 do not couple with the power (the adapter 205 of this invention), the battery 210 supplies the power for the DC-DC converters 212 via the second switch 225.

Figure 2B:
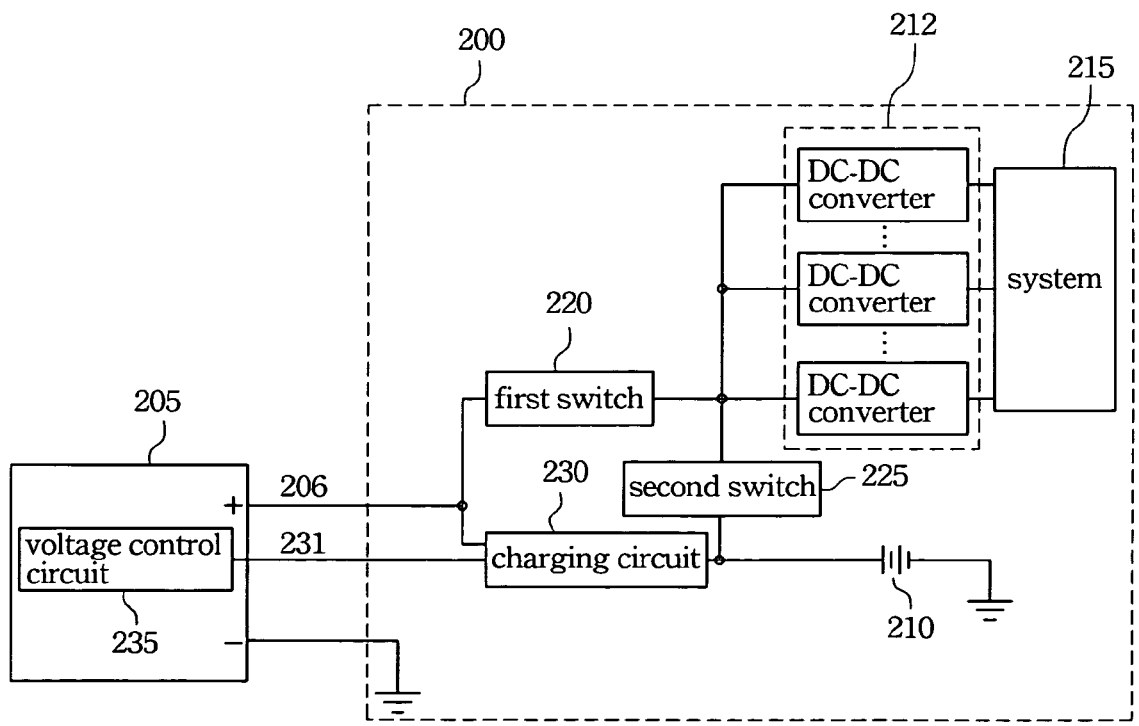
FIG. 2B is a functional block diagram of the control circuit built in the adapter according to one preferred embodiment of this invention.

FIG. 2B is a functional block diagram of the control circuit built in the adapter according to one preferred embodiment of this invention. The only difference between FIG. 2B and FIG. 2A is that the voltage control circuit 235 is built in the adapter 205 of this invention; the other parts are the same.

Figure 3:
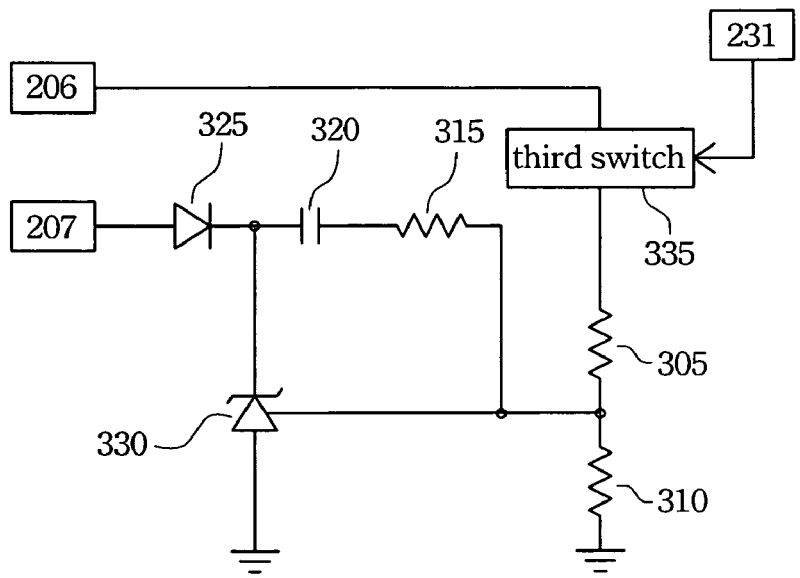
FIG. 3 is a circuit diagram of the control circuit according to one preferred embodiment of this invention.

FIG. 3 is a circuit diagram of the control circuit according to one preferred embodiment of this invention. Please also refer to FIG. 2A and FIG. 2B simultaneously, in both of which the control circuit 235 appears. In this embodiment, the charging circuit 230 generates the first signal to the first signal line 231 to control the third switch 335, and the third switch 335 couples with the voltage output line 206 of the adapter 205 of this invention. The second signal of the second signal line 207 feeds back to the adapter 205 of this invention, and the second signal of the second signal line 207 couples with an adjustable shunt regulator 330 via a diode 325. The first capacitor 320 and the third resistor 315 are serially connected to be a compensation circuit.

The combination of the first resistor 305, the second resistor 310 and the adjustable shunt regulator 330 can be used to adjust the second signal of the second signal line 207 and further change the output voltage of the adapter 205 of this invention. The adjustable shunt regulator 330 is a control module, and the adjustable shunt regulator 330 can influence the output voltages of the adapter 205 of this invention by these following formulas:

$$V_{out} = V_{ref} \times [1 + (R1/R2)]$$

where $V_{out}$ is the output voltage (second voltage) of the adapter 205 of this invention, $V_{ref}$ is the individual parameter of the adjustable shunt regulator 330, R1 is the resistance value of the first resistor 305, and R2 is the resistance value of the second resistor 310.

By the formulas described above, when the battery 210 needs to be charged, the charging circuit 230 does not generate the first signal of the first signal line 231, and the third switch 335 is not conductive as in the original situation; thus the adapter 205 of this invention generates the first voltage (original voltage). When the battery 210 does not need to be charged, the charging circuit 230 generates the first signal of the first signal line 231, and the third switch 335 is conductive. Therefore, the control circuit 235 generates the second signal of the second signal line 207 for the adapter 205 of this invention. Thus the adapter 205 of this invention generates the second voltage. And the second voltage can be adjusted by the resistance value of the first resistor 305 and the second resistor 310.

Figure 4:
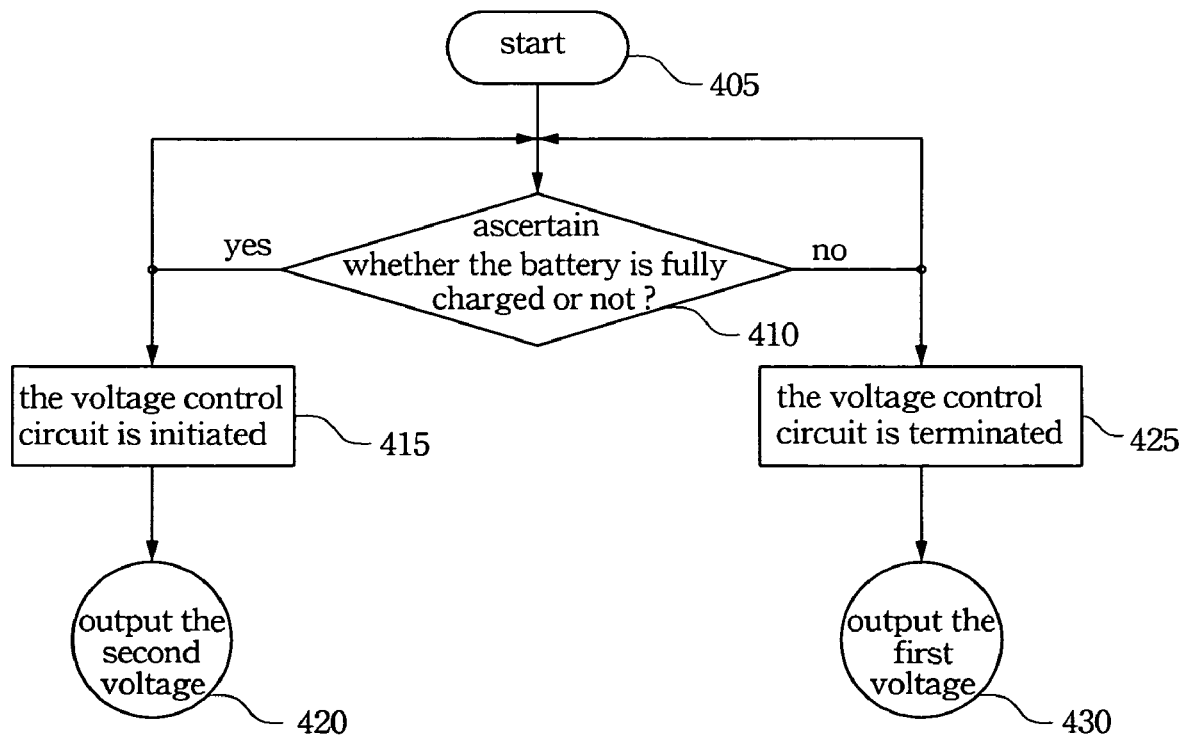
FIG. 4 is a flow chart of the output voltage produced by the power supply system according to one preferred embodiment of this invention.

FIG. 4 is the flow chart of the output voltage produced by the power supply system according to one preferred embodiment of this invention (please refer to FIG. 2 simultaneously). After starting (step 405), the charging circuit 230 ascertains whether the battery 210 is fully charged or not (step 410). If the battery 210 is fully charged, then the voltage control circuit 235 is initiated (step 415), and the adapter 205 of this invention outputs the second voltage (step 420). If the battery 210 is not fully charged, then the voltage control circuit 235 is terminated (step 425), and the adapter 205 of this invention outputs the first voltage (step 420). The charging circuit 230 always ascertains whether the battery 210 is fully charged or not during the step 410 to initiate or terminate the voltage control circuit 235.

The flowchart described above can reduce the voltage supplied for DC-DC converters when the battery does not need to be charged. By this method, the system efficiency is enhanced and the heat induced by the efficiency loss is reduced simultaneously.

The combination of the control circuit 235 can be implemented by using any suitable and available technology, such as an OP comparator, a resistor voltage divider circuit, a voltage feedback circuit or a single-chip.

Although the present invention has been described in considerable detail with reference to certain preferred embodiments thereof, other embodiments are possible. Therefore, the spirit and scope of the appended claims should not be limited to the description of the preferred embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A electric device with adjustable voltage that is installed in an electronic system, the electric device comprising:

a motherboard;

a battery coupled with the motherboard;

a charging circuit on the motherboard, the charging circuit arranged to couple with and charge the battery, and outputs a first signal when the battery is fully charged;

a voltage control circuit coupled with the charging circuit, the voltage control circuit arranged to receive the first signal and generate a second signal; and an adapter coupled with the motherboard, the adapter arranged to supply power to the electronic system and battery, wherein when the adapter receives the second signal, the adapter outputs a second voltage to the electronic system only, and when the adapter does not receive the second signal, the adapter outputs a first voltage to the electronic system and the battery both, wherein the first voltage is larger than the second voltage and the second voltage is not zero voltage.

2. The electric device of claim 1, wherein the voltage control circuit comprises at least one switch, at least two serial resistors coupled with the switch, and a control module coupling with a common node of the serial resistors.

3. The electric device of claim 2, further comprising a resistor and a capacitor to be a compensation circuit.

4. The electric device of claim 2, wherein the switch is conductive and generates the second signal for the adapter when the voltage control circuit receives the first signal.

5. The electric device of claim 2, wherein the switch is not conductive and does not generate the second signal for the adapter when the voltage control circuit does not receive the first signal.

6. The electric device of claim 2, wherein the control module can adjust the second signal according to a ratio between the serial resistors.

7. The electric device of claim 1, wherein the voltage control circuit is disposed on the motherboard.

8. The electric device of claim 1, wherein the voltage control circuit is disposed in the adapter.

* * * * *